March 23, 1926.
R. W. MUNGER
1,577,484
ENGINE VALVE STRUCTURE
Filed April 11, 1925
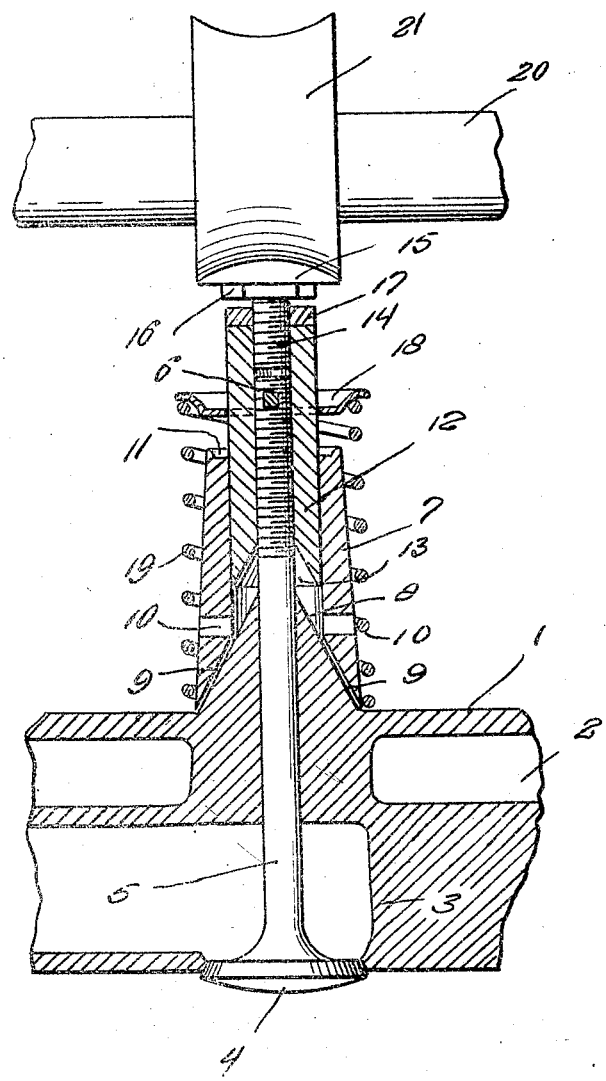
Inventor
R. W. Munger,
By Clarence O'Brien
Attorney Patented Mar. 23, 1926.

1,577,484

UNITED STATES PATENT OFFICE.

RICHARD W. MUNGER, OF TELKWA, BRITISH COLUMBIA, CANADA.

ENGINE-VALVE STRUCTURE.

Application filed April 11, 1925. Serial No. 22,358.

*To all whom it may concern:*

Be it known that I, RICHARD W. MUNGER, a subject of the King of England, residing at Telkwa, in the Province of British Columbia and Dominion of Canada, have invented certain new and useful Improvements in an Engine-Valve Structure, of which the following is a specification.

This invention relates to an improved engine valve of the type employed in conjunction with automobile internal combustion engines.

More particularly, the improvements relate to an improved structure of this class wherein the valve per se, is of the mushroom type and cooperates with novel means which serve to effectively guide the stem thereof.

Briefly, the invention comprises a guide socket which is mounted upon the cylinder head, and a sleeve which is slidable in said socket, this sleeve being adjustably connected with the valve stem and carrying an adjustable head adapted to be operated by a cam for depressing and opening the valve.

One feature of the invention is the particular construction employed for permitting effective lubrication of the valve stem without permitting passage of the lubricant into the explosion cylinder.

Another feature is the provision of oil passages in the socket for draining oil therefrom on the downward opening movement of the valve.

An additional feature is the provision of air ports at the upper ends of the drain passages, which ports serve to prevent the formation of a vacuum which would serve to suck surplus oil up into the socket.

Other features and advantages of the invention will become apparent from the following description and drawing.

In the accompanying drawings forming a part of this application and in which like numerals are employed to designate like parts throughout the same:

The figure represents a sectional and elevational view of a valve structure constructed in accordance with the present invention, showing portions of an engine cylinder head and tappet shaft.

Referring to the drawings in detail, the reference character 1 designates a fragment of an internal combustion head, which in the present instance is of a hollow formation to provide a water circulating and cooling chamber 2.

The head is provided with a seat for a conventional form of valve 4. In the present instance, the stem 5 of the valve has its upper end formed with screw threads and is provided adjacent its extremity with a transverse bore of polygonal cross section through which a correspondingly shaped washer retaining pin 6 passes.

It will be noted that the casing 1 is provided with an integral guide socket 7 and that this socket is provided with an internal conical projection 8. At this point the holes 9 are drilled downwardly and outwardly as the inclination shown and these constitute drain passages as will be more clearly understood from the following description.

Opposite the apex portion of the cone 8 and at diametrically opposite points, ports 10 are formed in the wall of the socket. Also, the upper end of the socket is formed with an annular groove 11 which constitutes an oil cup.

The screw threaded upper end of the valve stem 5 is tapped into an internally screw threaded sleeve 12 which is slidable in the socket 7, the lower end of the sleeve being formed with a conical recess for cooperation with a correspondingly shaped projection 8. When the valve is seated as shown in the drawing, the sleeve extends a considerable distance above the top of the socket, the upper portion thereof extending above the threaded end of the valve stem. This extended portion of the sleeve accommodates the screw threaded shank portion of a tappet head 15 which is threaded into the same as shown. This shank is provided with a flat faced wrench engaging portion 16 which serves to permit adjustment of the head. If desired, a lock nut 17 may be employed to maintain the shank in a set position.

Surrounding the projecting upper portion of the sleeve 12 is a dished washer 18 into the depression of which the aforesaid retaining pin 6 extends, the sleeve being provided at diametrically opposite points with openings to permit passage of the pin therethrough. Interposed between this washer and the cylinder head 1 is a coiled expansion spring 19 which serves to automatically close the valve. This spring surrounds the socket 7.

Disposed above the valve structure described is a rotatable shaft 20 mounted for rotation in a suitable manner, this shaft being provided with a cam or tappet 21 cooperating with the head 15. In this connection, I would point out that the periphery of the cam is provided with a groove which is shaped to correspond to the convexed discular head 15 before described.

From the foregoing description it will be seen that the valve stem will be firmly guided in its operation and if the valve and its seat are properly ground, accurate seating will be absolutely insured. Should it be desired to increase the effectiveness of the valve stem, this can be done through the adjustable connection afforded by the threaded guide sleeve and adjustable tappet head, such adjustment being facilitated by the wrench engaging portion 16. The guide sleeve will be effectively lubricated by oil placed in the cup 11, but any oil which may be collected from this or any other source in the bottom of the socket, will gravitate or drain downwardly through the passages 9. It will, however, be prevented from being sucked up into the socket through these passages owing to the existence of the air ports 10 which serve to prevent the formation of suction in the socket.

It is thought that the foregoing description taken in connection with the accompanying drawing will enable persons skilled in the art to which the invention relates to obtain a clear understanding of the same. Therefore, a more lengthy description is thought unnecessary.

Although the preferred embodiment of the invention has been shown and described, it is to be understood that minor changes coming within the field of invention claimed may be resorted to if desired.

Having thus described my invention, what I claim as new is:

1. In a structure of the class described, a cylinder head, the latter having a valve seat formed thereon, a valve cooperative with said seat, said valve including a stem, and a position of said stem being screw threaded and formed with a transverse hole, a guide socket carried by said head, a sleeve slidable in said socket, said sleeve being internally screw threaded and said valve stem being threaded into the sleeve, a washer surrounding said sleeve, a retaining pin passing through said sleeve and valve stem and cooperating with said washer to hold the same against movement in one direction, a coiled spring surrounding said socket and bearing at one end against said cylinder head and at its opposite end against said washer, and a tappet head including a screw threaded shank tapped into the upper portion of said sleeve.

2. In a structure of the class described, a cylinder head embodying a portion having a valve seat formed thereon, a valve cooperative with said seat, said valve including a stem, and a portion of said stem being screw threaded and formed with a transverse hole, a guide socket carried by said head, a sleeve slidable in said socket, said sleeve being internally screw threaded and said valve stem being threaded into the sleeve, a washer surrounding said sleeve, a retaining pin passing through said sleeve and valve stem and cooperating with said washer to hold the same against movement in one direction, a coiled spring surrounding said socket and bearing at one end against said cylinder head and at its opposite end against said washer, a tappet head including a screw threaded shank tapped into the upper portion of said sleeve, said socket being provided with downwardly inclined oil drain passages leading from the recess therein outwardly through the wall thereof, the wall of said socket being also provided above said passages with air ports.

In testimony whereof I affix my signature.

RICHARD W. MUNGER.